US011875777B2

(12) United States Patent
Daido

(10) Patent No.: US 11,875,777 B2
(45) Date of Patent: Jan. 16, 2024

(54) INFORMATION PROCESSING METHOD, ESTIMATION MODEL CONSTRUCTION METHOD, INFORMATION PROCESSING DEVICE, AND ESTIMATION MODEL CONSTRUCTING DEVICE

(71) Applicant: YAMAHA CORPORATION, Hamamatsu (JP)

(72) Inventor: Ryunosuke Daido, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 17/698,601

(22) Filed: Mar. 18, 2022

(65) Prior Publication Data

US 2022/0208175 A1 Jun. 30, 2022

Related U.S. Application Data

(63) Continuation of application No. PCT/JP2020/036355, filed on Sep. 25, 2020.

(30) Foreign Application Priority Data

Sep. 26, 2019 (JP) ................................ 2019-175436

(51) Int. Cl.
*G10L 21/00* (2013.01)
*G10L 13/00* (2006.01)
(Continued)

(52) U.S. Cl.
CPC ........ *G10L 13/0335* (2013.01); *G10L 13/047* (2013.01); *G10L 25/18* (2013.01)

(58) Field of Classification Search
CPC ......... G10L 21/00; G10L 13/00; G10L 13/06; G10L 17/26; G10L 25/48
See application file for complete search history.

(56) References Cited

U.S. PATENT DOCUMENTS 4,218,624 A 8/1980 Schiavone
7,626,113 B2 12/2009 Kuroda
(Continued)

FOREIGN PATENT DOCUMENTS

JP 2008015195 A * 1/2008 ............ G09B 15/00
JP 2011242755 A * 12/2011 ............ G10L 17/26
(Continued)

OTHER PUBLICATIONS

Nakamura et al.; "Singing voice synthesis based on convolutional neural networks"; Apr. 15, 2019; pp. 1-5; arXiv preprint arXiv: 1904.06868 (Year: 2019).*
(Continued)

*Primary Examiner* — Shreyans A Patel
(74) *Attorney, Agent, or Firm* — ROSSI, KIMMS & McDOWELL LLP

(57) ABSTRACT

An information processing device includes a memory storing instructions, and a processor configured to implement the stored instructions to execute a plurality of tasks. The tasks includes: a first generating task that generates a series of fluctuations of a target sound based on first control data of the target sound to be synthesized, using a first model trained to have an ability to estimate a series of fluctuations of the target sound based on first control data of the target sound, and a second generating task that generates a series of features of the target sound based on second control data of the target sound and the generated series of fluctuations of the target sound, using a second model trained to estimate a series of features of the target sound based on second control data of the target sound and a series of fluctuations of the target sound.

16 Claims, 9 Drawing Sheets

(51) Int. Cl.

| | |
|---|---|
| ***G10L 13/06*** | (2013.01) |
| ***G10L 17/26*** | (2013.01) |
| ***G10L 25/48*** | (2013.01) |
| ***G10L 13/033*** | (2013.01) |
| ***G10L 13/047*** | (2013.01) |
| ***G10L 25/18*** | (2013.01) |

(56) References Cited

U.S. PATENT DOCUMENTS

| | | | | |
|---|---|---|---|---|
| 2020/0294484 | A1 | | 9/2020 | Daido |
| 2021/0034666 | A1 | * | 2/2021 | Detroja ................. G06F 16/685 |

FOREIGN PATENT DOCUMENTS

| | | | | | |
|---|---|---|---|---|---|
| JP | 2013164609 | A | * | 8/2013 | ........... G10H 1/0008 |
| JP | 2013164609 | A | | 8/2013 | |
| JP | 6268916 | B2 | * | 1/2018 | |
| JP | 6784758 | B2 | * | 11/2020 | ......... G10L 21/0208 |
| JP | 6798484 | B2 | * | 12/2020 | ............... G06F 3/01 |
| KR | 20200116654 | A | * | 10/2020 | |
| WO | WO-2004068098 | A1 | * | 8/2004 | ........... G10L 19/005 |
| WO | 2019107378 | A1 | | 6/2019 | |
| WO | WO-2019107378 | A1 | * | 6/2019 | ........... G06N 3/0454 |

OTHER PUBLICATIONS

English translation of Written Opinion issued in Intl. Appln. No. PCT/JP2020/036355 dated Oct. 27, 2020, previously cited in IDS filed Mar. 18, 2022.

Blaauw "A Neural Parametric Singing Synthesizer Modeling Timbre and Expression from Natural Songs," Applied Sciences 7(12):1313, 2017: pp. 1-23. Cited in the specification.

International search report issued in Intl. Appln. No. PCT/JP2020/036355 dated Oct. 27, 2020. English translation provided.

Written Opinion issued in Intl. Appln. No. PCT/JP2020/036355 dated Oct. 27, 2020.

Nakamura "Singing voice synthesis based on convolutional neural networks", arXiv:1904.06868v2. Jun. 25, 2019: pp. 1-5.

* cited by examiner

INFORMATION PROCESSING METHOD, ESTIMATION MODEL CONSTRUCTION METHOD, INFORMATION PROCESSING DEVICE, AND ESTIMATION MODEL CONSTRUCTING DEVICE

CROSS-REFERENCE TO RELATED APPLICATIONS

This is a continuation of International Application No. PCT/JP2020/036355 filed on Sep. 25, 2020, and claims priority from Japanese Patent Application No. 2019-175436 filed on Sep. 26, 2019, the entire content of which is incorporated herein by reference.

TECHNICAL FIELD

The present disclosure relates to a technique for generating a series of features relating to a sound such as a voice or a musical sound.

BACKGROUND ART

A sound synthesis technique for synthesizing any sound such as a singing voice or a playing sound of a musical instrument has been commonly proposed. For example, below Non-Patent Literature 1 discloses a technique for generating a series of pitches in a synthesis sound using neural networks. An estimation model for estimating a series of pitches is constructed by machine learning using a plurality of pieces of training data including a series of pitches.

Non-Patent Literature 1: Merlijn Blaauw, Jordi Bonada, "A Neural Parametric Singing Synthesizer Modeling Timbre and Expression from Natural Songs," Applied Sciences 7(12):1313, 2017

The series of pitches in each of the plurality of pieces of training data includes a dynamic component that fluctuates with time (hereinafter, referred to as a "series of fluctuations"). However, in an estimation model constructed using a plurality of pieces of training data, there is a tendency that a series of pitches in which a series of fluctuations is suppressed is generated. Therefore, there is a limit to generate a high-quality synthesis sound sufficiently including a series of fluctuations. In the above description, the case of generating a series of pitches is focused on, and the same problem is also assumed in a situation in which a series of features other than the pitches is generated.

SUMMARY OF INVENTION

In consideration of the above circumstances, an object of an aspect of the present disclosure is to generate a high-quality synthesis sound in which a series of features appropriately includes a series of fluctuations.

In order to solve the above problem, a first aspect of non-limiting embodiments of the present disclosure relates to provide an information processing method including:

generating a series of fluctuations of a target sound by processing first control data of the target sound to be synthesized, using a first model trained to have an ability to estimate a series of fluctuations of a target sound based on first control data of the target sound; and generating a series of features of the target sound by processing second control data of the target sound and the generated series of fluctuations of the target sound, using a second model trained to have an ability to estimate a series of features of the target sound based on second control data of the target sound and a series of fluctuations of the target sound.

A second aspect of non-limiting embodiments of the present disclosure relates to provide an estimation model construction method including:

generating a series of features and a series of fluctuations based on a reference signal indicating a picked-up sound for training;

establishing, by machine learning using first control data corresponding to the picked-up sound and a series of fluctuations of the picked-up sound, a first model trained to have an ability to estimate a series of fluctuations of a target sound to be synthesized based on first control data of the target sound; and establishing, by machine learning using second control data corresponding to the picked-up sound, the series of fluctuations, and the series of features, a second model trained to have an ability to estimate a series of features of the target sound based on second control data of the target sound and a series of fluctuations of the target sound.

A third aspect of non-limiting embodiments of the present disclosure relates to provide an information processing device including:

a memory storing instructions; and a processor configured to implement the stored instructions to execute a plurality of tasks, including:

a first generating task that generates a series of fluctuations of a target sound based on first control data of the target sound to be synthesized, using a first model trained to have an ability to estimate a series of fluctuations of the target sound based on first control data of the target sound; an a second generating task that generates a series of features of the target sound based on second control data of the target sound and the generated series of fluctuations of the target sound, using a second model trained to estimate a series of features of the target sound based on second control data of the target sound and a series of fluctuations of the target sound.

A fourth aspect of non-limiting embodiments of the present disclosure relates to provide an estimation model constructing device including:

a memory storing instructions; and a processor configured to implement the stored instructions to execute a plurality of tasks, including:

a generating task that generates a series of features and a series of fluctuations based on a reference signal indicating a picked-up sound for training;

a first training task that establishes, by machine learning using first control data corresponding to the picked-up sound and a series of fluctuations of the picked-up sound, a first model trained to have an ability to estimate a series of fluctuations of a target sound to be synthesized based on first control data of the target sound; and a second training task that establishes, by machine learning using second control data corresponding to the picked-up sound, the series of fluctuations, and the series of features, a second model trained to have an ability to estimate a series of features of the target sound based on second control data of the target sound and a series of fluctuations of the target sound.

DESCRIPTION OF EMBODIMENTS

A: First Embodiment

Figure 1:
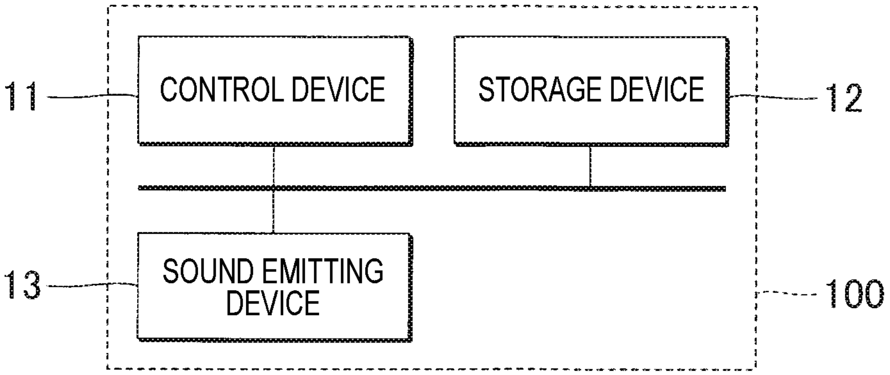
FIG. 1 is a block diagram illustrating a configuration of a sound synthesizer.

FIG. 1 is a block diagram illustrating a configuration of a sound synthesizer 100 according to a first embodiment of the present disclosure. The sound synthesizer 100 is an information processing device for generating any sound to be a target to be synthesized (hereinafter, referred to as a "target sound"). The target sound is, for example, a singing voice generated by a singer virtually singing a music piece, or a musical sound generated by a performer virtually playing a music piece with a musical instrument. The target sound is an example of a "sound to be synthesized".

The sound synthesizer 100 is implemented by a computer system including a control device 11, a storage device 12, and a sound emitting device 13. For example, an information terminal such as a mobile phone, a smartphone, or a personal computer is used as the sound synthesizing apparatus 100. Note that the sound synthesizer 100 may be implemented by a set (that is, a system) of a plurality of devices configured separately from each other.

The control device 11 includes one or more processors that control each element of the sound synthesizer 100. For example, the control device 11 is configured by one or more types of processors such as a central processing unit (CPU), a graphics processing unit (GPU), a digital processor (DSP), a field programmable gate array (FPGA), and an application specific integrated circuit (ASIC). Specifically, the control device 11 generates a sound signal V in a time domain representing a waveform of the target sound.

The sound emitting device 13 emits a target sound represented by the sound signal V generated by the control device 11. The sound emitting device 13 is, for example, a speaker or a headphone. A D/A converter that converts the sound signal V from digital to analog and an amplifier that amplifies the sound signal V are not shown for the sake of convenience. Although FIG. 1 illustrates a configuration in which the sound emitting device 13 is mounted on the sound synthesizer 100, the sound emitting device 13 separate from the sound synthesizer 100 may be connected to the sound synthesizer 100 in a wired or wireless manner.

Figure 2:
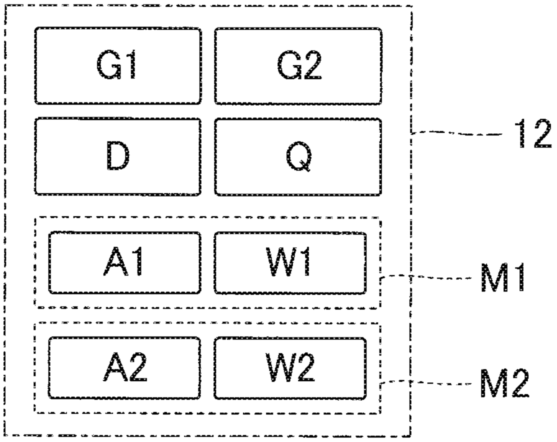
FIG. 2 is a schematic diagram of a storage device.

As illustrated in FIG. 2, the storage device 12 is one or more memories that store programs (for example, a sound synthesis program G1 and a machine learning program G2) to be executed by the control device 11 and various types of pieces of data (for example, music data D and reference data Q) to be used by the control device 11. The storage device 12 is configured by a known recording medium such as a magnetic recording medium and a semiconductor recording medium. The storage device 12 may be configured by a combination of a plurality of types of recording media. In addition, a portable recording medium attachable to and detachable from the sound synthesizer 100 or an external recording medium (for example, an online storage) with which the sound synthesizer 100 can communicate may be used as the storage device 12.

The music data D specifies a series of notes (that is, a musical score) constituting a music piece. For example, the musical data D is time-series data that specifies a pitch and a period for each sounding unit. The sounding unit is, for example, one note. In this case, one note may be divided into a plurality of sounding units. In the music data D used for the synthesis of the singing voice, a phoneme (for example, a pronunciation character) is specified for each sounding unit.

A1: Synthesis Processing Portion 20

Figure 3:
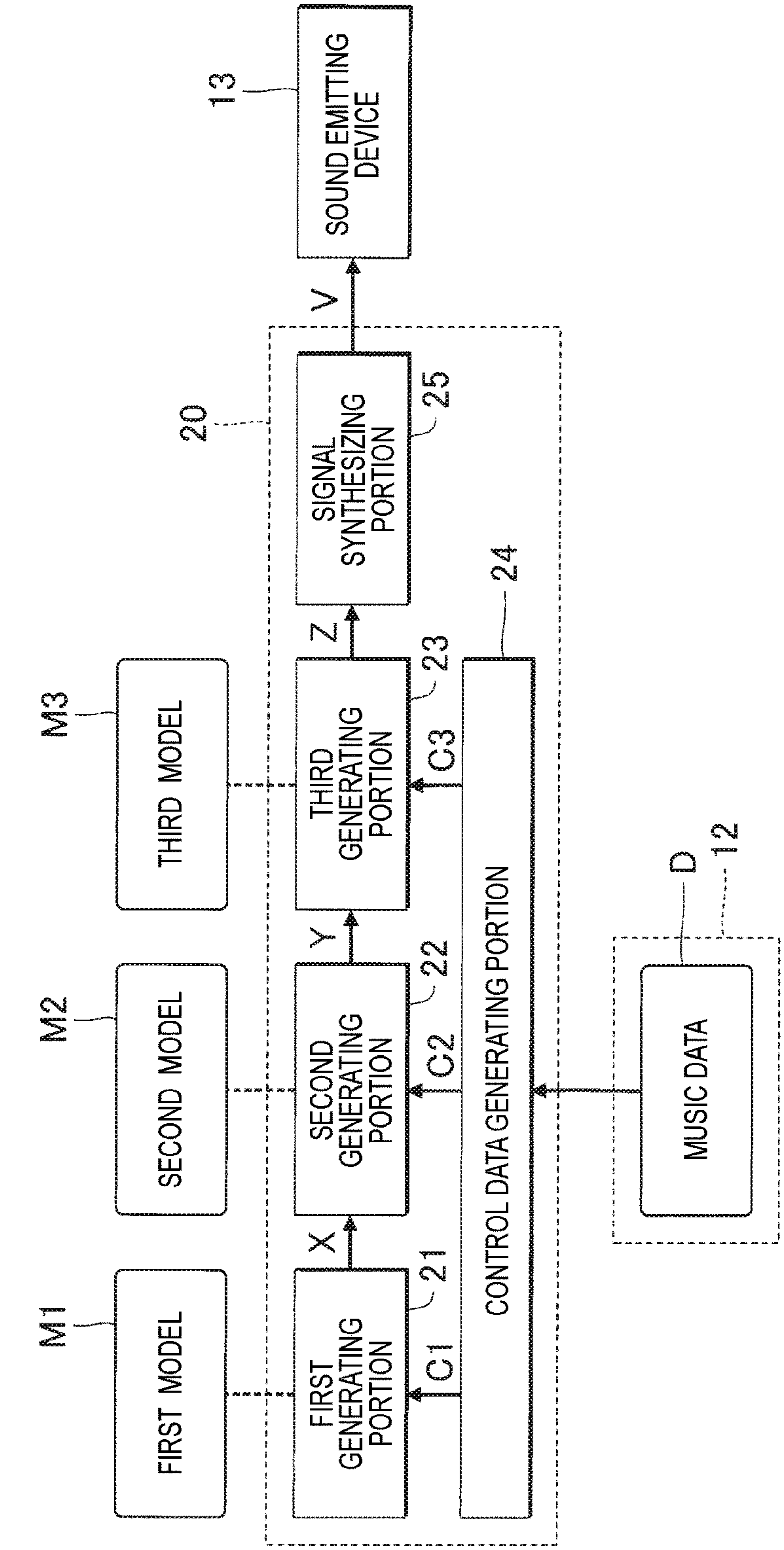
FIG. 3 is a block diagram illustrating a configuration of a synthesis processing portion.

The control device 11 functions as the synthesis processing portion 20 illustrated in FIG. 3 by executing the sound synthesis program G1. The synthesis processing portion 20 generates a sound signal V according to the music data D. The synthesis processing portion 20 includes a first generating portion 21, a second generating portion 22, a third generating portion 23, a control data generating portion 24, and a signal synthesizing portion 25.

The control data generating portion 24 generates first control data C1, second control data C2, and third control data C3 based on the music data D. The control data C (C1, C2, C3) is data that specifies a condition relating to the target sound. The control data generating portion 24 generates each piece of control data C for each unit period (for example, a frame having a predetermined length) on a time axis. The control data C of each unit period specifies, for example, a pitch of a note in the unit period, the start or end of a sound-emitting period, and a relation (for example, a context such as a pitch difference) between adjacent notes. The control data generating portion 24 is configured by a model such as a deep neural network in which a relation between the music data D and each control data C is learned by machine learning.

The first generating portion 21 generates a series of fluctuations X according to the first control data C1. Each fluctuation X is sequentially generated for each unit period. That is, the first generating portion 21 generates a series of fluctuations X based on a series of the first control data C1. The first control data C1 is also referred to as data that specifies a condition of the series of fluctuations X.

The series of fluctuations X is a dynamic component that varies with time in a time series of pitches (fundamental frequency) Y of the target sound. Assuming a static component that varies slowly with time in a series of the pitches Y, a dynamic component other than the static component corresponds to the series of fluctuations X. For example, the series of fluctuations X is a high-frequency component that is higher than a predetermined frequency in the series of pitches Y. In addition, the first generating portion 21 may generate a temporal differential value relating to the series of pitches Y as the series of fluctuations X. The series of the series of fluctuations X includes both intentional fluctuation as a music expression such as vibrato and stochastic fluctuation (a fluctuation component) stochastically occurring in a singing voice or a musical sound.

A first model M1 is used for the generation of the series of fluctuations X by the first generating portion 21. The first model M1 is a statistical model that receives the first control data C1 and estimates the series of fluctuations X. That is, the first model M1 is a trained model that has well learned a relation between the first control data C1 and the series of fluctuations X.

The first model M1 is configured by, for example, a deep neural network. Specifically, the first model M1 is a recurrent neural network (RNN) that causes a series of fluctuations X generated for each unit period to regress to an input layer in order to generate a series of fluctuations X in the immediately subsequent unit period. In this case, any type of neural network such as a convolutional neural network (CNN) may be used as the first model M1. The first model M1 may include an additional element such as a long short-term memory (LSTM). In an output stage of the first model M1, an output layer that defines a probability distribution of each fluctuation X and a sampling portion that generates (samples) a random number following the probability distribution as the fluctuation X are installed.

The first model M1 is implemented by a combination of an artificial intelligence program A1 that causes the control device 11 to execute numerical operations of generating the series of fluctuations X based on the first control data C1 and a plurality of variables W1 (specifically, a weighted value and a bias) applied to the numerical operations. The artificial intelligence program A1 and the plurality of variables W1 are stored in the storage device 12. A numerical value of each of the plurality of variables W1 is set by machine learning.

The second generating portion 22 generates a series of pitches Y according to the second control data C2 and the series of fluctuations X. Each pitch Y is sequentially generated for each unit period. That is, the second generating portion 22 generates the series of the pitches Y based on the series of the second control data C2 and the series of the series of fluctuations X. The series of the pitches Y constitute a pitch curve including the series of fluctuations X that dynamically varies with time and a static component that varies slowly with time as compared with the series of fluctuations X. The second control data C2 is also referred to as data that specifies a condition of the series of pitches Y.

The second model M2 is used for the generation of the series of pitches Y by the second generating portion 22. The second model M2 is a statistical model that receives the second control data C2 and the series of fluctuations X and estimates the series of pitches Y. That is, the second model M2 is a trained model that has well learned a relation between the series of pitches Y and a combination of the second control data C2 and the series of fluctuations X.

The second model M2 is configured by, for example, a deep neural network. Specifically, the second model M2 is configured by, for example, any type of neural network such as a convolutional neural network and a recurrent neural network. The second model M2 may include an additional element such as a long short-term memory. In an output stage of the second model M2, an output layer that defines a probability distribution of each pitch Y and a sampling portion that generates (samples) a random number following the probability distribution as the pitch Y are installed.

The second model M2 is implemented by a combination of an artificial intelligence program A2 that causes the control device 11 to execute numerical operations of generating the series of pitches Y based on the second control data C2 and the series of fluctuations X, and a plurality of variables W2 (specifically, a weighted value and a bias) applied to the numerical operations. The artificial intelligence program A2 and the plurality of variables W2 are stored in the storage device 12. A numerical value of each of the plurality of variables W2 is set by machine learning.

The third generating portion 23 generates a series of spectral features Z according to the third control data C3 and the series of pitches Y. Each spectral feature Z is sequentially generated for each unit period. That is, the third generating portion 23 generates a series of spectral features Z based on a series of the third control data C3 and the series of pitches Y. The spectral feature Z according to the first embodiment is, for example, an amplitude spectrum of the target sound. The third control data C3 is also referred to as data that specifies a condition of the series of spectral features Z.

The third model M3 is used for the generation of the series of spectral features Z by the third generating portion 23. The third model M3 is a statistical model that generates the series of spectral features Z according to the third control data C3 and the series of pitches Y. That is, the third model M3 is a trained model that has well learned a relation between the series of spectral features Z and the combination of the third control data C3 and the series of pitches Y.

The third model M3 is configured by, for example, a deep neural network. Specifically, the third model M3 is configured by, for example, any type of neural network such as a convolutional neural network and a recurrent neural network. The third model M3 may include an additional element such as a long short-term memory. In an output stage of the third model M3, an output layer that defines a probability distribution of each component (frequency bin) representing each spectral feature Z and a sampling portion that generates (samples) a random number following the probability distribution as each component constituting the spectral feature Z are installed.

The third model M3 is implemented by a combination of an artificial intelligence program A3 that causes the control device 11 to execute numerical operations of generating the series of spectral features Z based on the third control data C3 and the pitches Y, and a plurality of variables W3 (specifically, a weighted value and a bias) applied to the numerical operations. The artificial intelligence program A3 and the plurality of variables W3 are stored in the storage device 12. A numerical value of each of the plurality of variables W3 is set by machine learning.

The signal synthesizing portion 25 generates the sound signal V based on the series of the series of spectral features Z generated by the third generating portion 23. Specifically, the signal synthesizing portion 25 converts the series of spectral features Z into a waveform by an operation including, for example, a discrete inverse Fourier transform, and generates the sound signal V by coupling the waveforms over a plurality of unit periods. The sound signal V is supplied to the sound emitting device 13.

The signal synthesizing portion 25 may include a so-called neural vocoder that has well learned a latent relation between the series of the series of spectral features Z and the sound signal V by machine learning. The signal synthesizing portion 25 processes the series of the supplied series of spectral features Z using a neural vocoder to generate the sound signal V.

Figure 4:
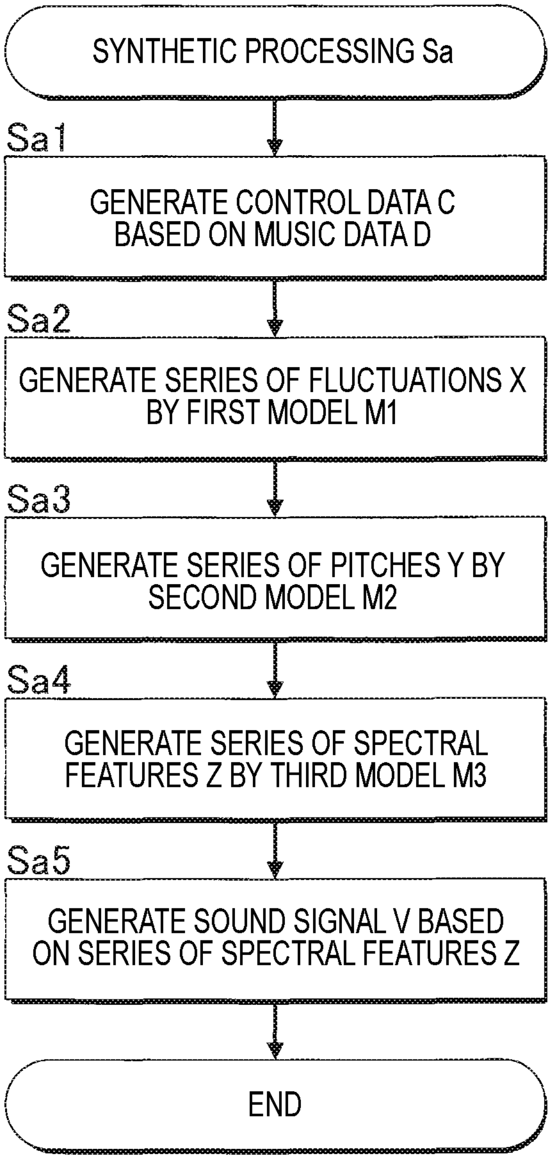
FIG. 4 is a flowchart illustrating a specific procedure of synthetic processing.

FIG. 4 is a flowchart illustrating a specific procedure of processing (hereinafter, referred to as "synthetic processing") Sa for generating the sound signal V by the control device 11 (synthesis processing portion 20). For example, the synthetic processing Sa is started in response to an instruction from the user for the sound synthesizer 100. The synthetic processing Sa is executed for each unit period.

The control data generating portion 24 generates the music data (C1, C2, C3) based on the music data D (Sa1).

The first generating portion 21 generates the series of fluctuations X by processing the first control data C1 using the first model M1 (Sa2). The second generating portion 22 generates the series of pitches Y by processing the second control data C2 and the series of fluctuations X using the second model M2 (Sa3). The third generating portion 23 generates the series of spectral features Z by processing the third control data C3 and the series of pitches Y using the third model M3 (Sa4). The signal synthesizing portion 25 generates the sound signal V based on the series of spectral features Z (Sa5).

As described above, in the first embodiment, the series of fluctuations X according to the first control data C1 is generated by the first model M1, and the series of pitches Y according to the second control data C2 and the series of fluctuations X is generated by the second model M2. Therefore, it is possible to generate a series of the pitch Y including a plenty of fluctuations X, as compared with a traditional configuration (hereinafter, referred to as "comparative example") in which the series of pitches Y is generated, according to the control data, using a single model that learns a relation between the control data specifying the target sound and the series of pitches Y. According to the above configuration, it is possible to generate a target sound including a large number of hearingly natural series of fluctuations X.

A2: Learning Processing Portion 30

Figure 5:
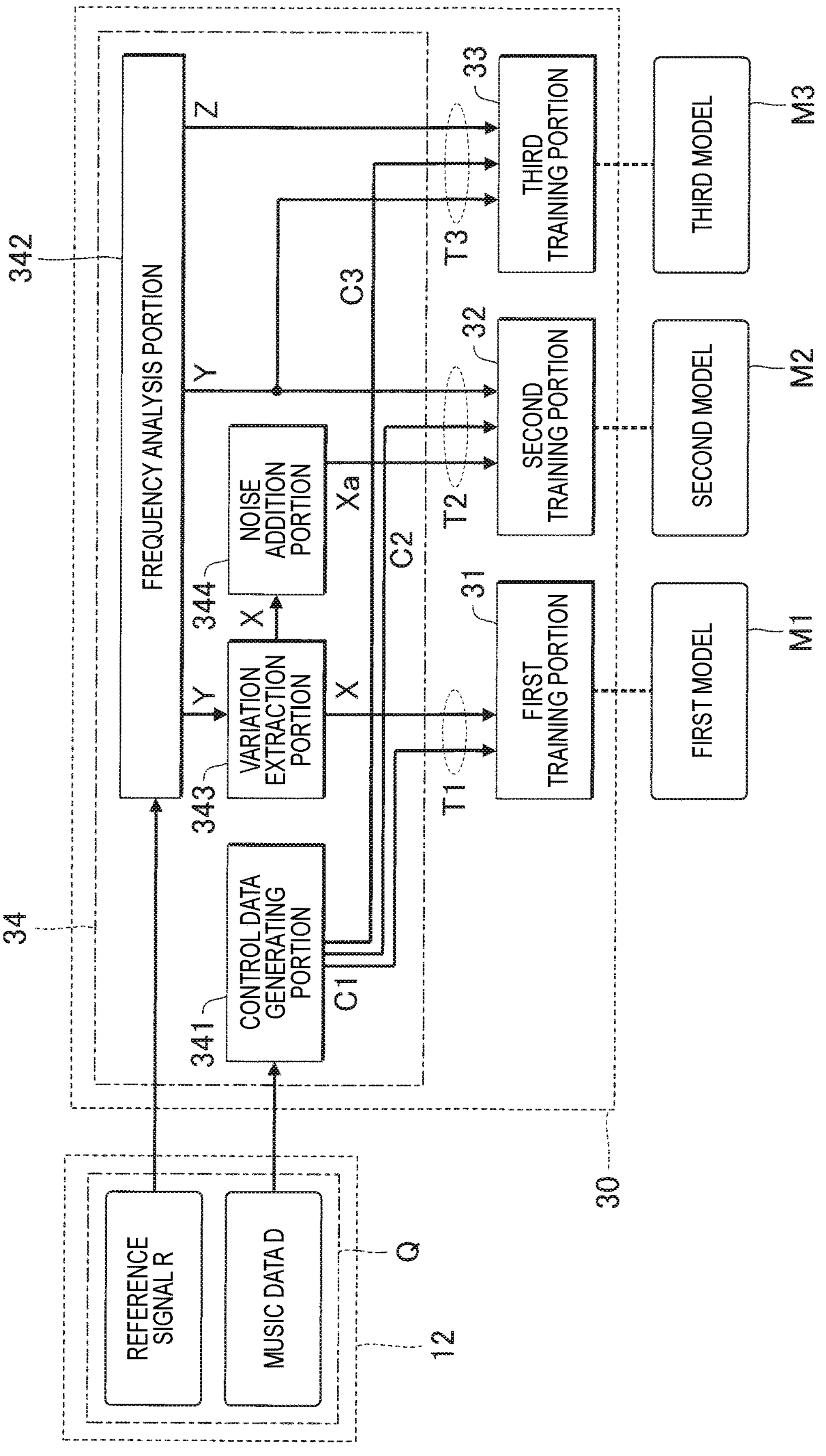
FIG. 5 is a block diagram illustrating a configuration of a learning processing portion.

The control device 11 functions as a learning processing portion 30 of FIG. 5 by executing the machine learning program G2. The learning processing portion 30 constructs the first model M1, the second model M2, and the third model M3 by machine learning.

Specifically, the learning processing portion 30 sets a numerical value of each of the plurality of variables W1 in the first model M1, a numerical value of each of the plurality of variables W2 in the second model M2, and a numerical value of each of the plurality of variables W3 in the third model M3.

The storage device 12 stores a plurality of pieces of reference data Q. Each of the plurality of pieces of reference data Q is data in which the music data D and the reference signal R are associated with each other. The music data D specifies a series of notes constituting the music. The reference signal R of each piece of reference data Q represents a waveform of a sound generated by singing or playing the music represented by the music data D of the reference data Q. A voice sung by a specific singer or a musical sound played by a specific performer is recorded in advance, and a reference signal R representing the voice or the musical sound is stored in the storage device 12 together with the music data D. Note that the reference signal R may be generated based on voices of a large number of singers or musical sounds of a large number of players.

The learning processing portion 30 includes a first training portion 31, a second training portion 32, a third training portion 33, and a training data preparation portion 34. The training data preparation portion 34 prepares a plurality of pieces of first training data T1, a plurality of pieces of second training data T2, and a plurality of pieces of third training data T3. Each of the plurality of pieces of first training data T1 is a piece of known data, and includes the first control data C1 and the series of fluctuations X associated with each other. Each of the plurality of pieces of second training data T2 is a piece of known data, and includes a combination of the second control data C2 and a series of fluctuations Xa, and the series of pitches Y associated with the combination. The series of fluctuations Xa is obtained by adding a noise component to the series of fluctuations X. Each of the plurality of pieces of third training data T3 is a piece of known data, and includes the combination of the third control data C3 and the series of pitches Y, and the series of spectral features Z associated with the combination.

The training data preparation portion 34 includes a control data generating portion 341, a frequency analysis portion 342, a variation extraction portion 343, and a noise addition portion 344. The control data generating portion 341 generates the control data C (C1, C2, C3) for each unit period based on the music data D of each piece of reference data Q. The configurations and operations of the control data generating portion 341 are the same as those of the control data generating portion 24 described above.

The frequency analysis portion 342 generates a series of pitches Y and a series of spectral features Z based on the reference signal R of each piece of reference data Q. Each pitch Y and each spectral feature Z are generated for each unit period. That is, the frequency analysis portion 342 generates a series of pitch Y and a series of spectral features Z of the reference signal R. A known analysis technique such as a discrete Fourier transform is optionally adopted to generate the series of pitches Y and the series of spectral features Z of the reference signal R.

The variation extraction portion 343 generates a series of fluctuations X from the pitch Y. The series of fluctuations X is generated for each unit period. That is, the variation extraction portion 343 generates a series of the series of fluctuations X based on the series of the pitch Y. Specifically, the variation extraction portion 343 calculates a differential value in the series of the pitch Y as the series of fluctuations X. A filter (high-pass filter), which extracts a high-frequency component being higher than a predetermined frequency as the series of fluctuations X, may be adopted as the variation extraction portion 343.

The noise addition portion 344 generates the series of fluctuations Xa by adding a noise component to the series of the series of fluctuations X. Specifically, the noise addition portion 344 adds a random number following a predetermined probability distribution, such as a normal distribution, to the series of the series of fluctuations X as a noise component. In a configuration in which the noise component is not added to the series of the series of fluctuations X, there is a tendency that a series of fluctuations X excessively reflecting the variation component of the series of pitches Y in each reference signal R is estimated by the first model M1. In the first embodiment, since the noise component is added to the series of fluctuations X (that is, regularization), there is an advantage that the series of fluctuations X appropriately reflecting the tendency of a varying component of the series of pitches Y in the reference signal R can be estimated by the first model M1. However, when excessive reflection of the reference signal R does not cause a particular problem, the noise addition portion 344 may be omitted.

The first training data T1 in which the first control data C1 and the series of fluctuations X (as ground truth) are associated with each other is supplied to the first training portion 31. The second training data T2 in which the combination of the second control data C2 and the series of fluctuations X is associated with the series of pitches Y (as ground truth) is supplied to the second training portion 32. The third training data T3 in which the combination of the third control data C3 and the series of pitches Y is associated with the series of spectral features Z (as ground truth) is supplied to the third training portion 33.

The first training portion 31 constructs a first model M1 by supervised machine learning using a plurality of pieces of first training data T1. Specifically, the first training portion 31 repeatedly updates the plurality of variables W1 relating to the first model M1 such that an error between a series of fluctuations X generated by a provisional first model M1 supplied with first control data C1 in each first training data T1 and a series of fluctuations X (ground truth) in the first training data T1 is reduced enough. Therefore, the first model M1 learns a latent relation between the series of fluctuations X and the first control data C1 in the plurality of pieces of first training data T1. That is, the first model M1, which is trained by the first training portion 31, has an ability to estimate a series of fluctuations X, statistically appropriate in the view of the latent relation, according to unknown first control data C1.

The second training portion 32 establishes a second model M2 by supervised machine learning using a plurality of pieces of second training data T2. Specifically, the second training portion 32 repeatedly updates the plurality of variables W2 relating to the second model M2 such that an error between a series of pitches Y generated by a provisional second model M2 supplied with second control data C2 and a series of fluctuations X in each second training data T2 and a series of pitches Y (ground truth) in the second training data T2 is reduced enough. Therefore, the second model M2 learns a latent relation between the series of pitches Y and the combination of the second control data C2 and the series of fluctuations X in the plurality of pieces of second training data T2. That is, the second model M2, which is trained by the second training portion 32, has an ability to estimate a series of pitches Y, statistically appropriate in the view of the latent relation, according to an unknown combination of control data C2 and a series of fluctuations X.

The third training portion 33 constructs a third model M3 by supervised machine learning using a plurality of pieces of third training data T3. Specifically, the third training portion 33 repeatedly updates the plurality of variables W3 relating to the third model M3 such that an error between a series of spectral features Z generated by a provisional third model M3 suppled with third control data C3 and a series of pitches Y in each third training data T3 and a series of spectral features Z (ground truth) in the third training data T3 is reduced enough. Therefore, the third model M3 learns a latent relation between the series of spectral features Z and the combination of the third control data C3 and the pitch Y in the plurality of pieces of third training data T3. That is, the third model M3, which is trained by the third training portion 33, estimates a statistically appropriate series of spectral features Z relative to an unknown combination of a piece of third control data C3 and a pitch Y based on the relation.

Figure 6:
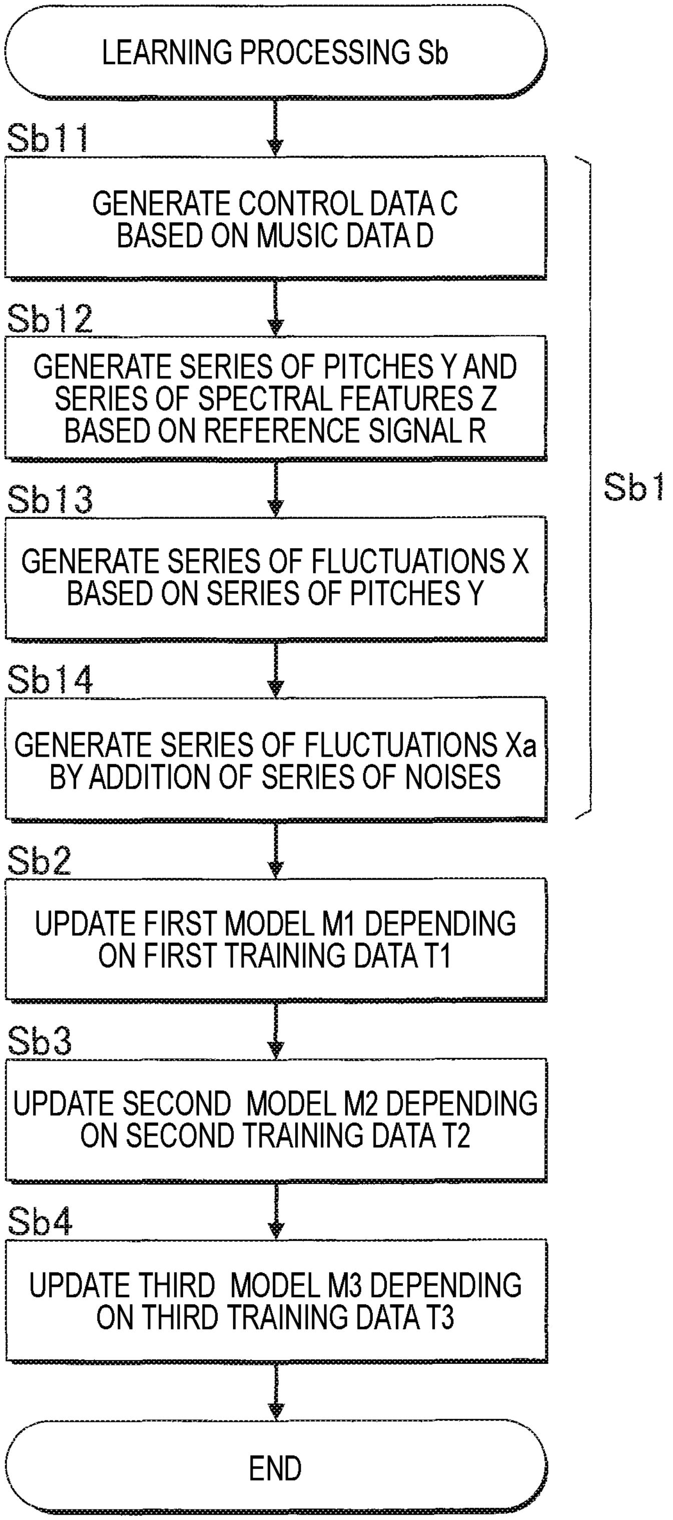
FIG. 6 is a flowchart illustrating a specific procedure of learning processing.

FIG. 6 is a flowchart illustrating a specific procedure of processing (hereinafter, referred to as a "learning processing") Sb for training the model M (M1, M2, M3) by the control device 11 (the learning processing portion 30). For example, the learning processing Sb is started in response to an instruction from the user for the sound synthesizer 100. The learning processing Sb is executed for each unit period.

The training data preparation portion 34 generates the first training data T1, the second training data T2, and the third training data T3 based on the reference data Q (Sb1). Specifically, the control data generating portion 341 generates the first control data C1, the second control data C2, and the third control data C3 based on the music data D (Sb11). The frequency analysis portion 342 generates a series of pitches Y and a series of spectral features Z based on the reference signal R (Sb12). The variation extraction portion 343 generates a series of fluctuations X based on a series of the pitches Y (Sb13). The noise addition portion 344 generates a series of fluctuations Xa by adding a series of noises to the series of fluctuations X (Sb14). Through the above processing, the first training data T1, the second training data T2, and the third training data T3 are generated. The order of the generation of each piece of the control data C (Sb11) and the processes relating to the reference signal R (Sb12 to Sb14) may be reversed.

The first training portion 31 updates the plurality of variables W1 of the first model M1 by machine learning in which the first training data T1 is used (Sb2). The second training portion 32 updates the plurality of variables W2 of the second model M2 by machine learning in which the second training data T2 is used (Sb3). The third training portion 33 updates the plurality of variables W3 of the third model M3 by machine learning in which the third training data T3 is used (Sb4). The first model M1, the second model M2, and the third model M3 are established by repeating the learning processing Sb described above.

In the above-described comparative example using a single model that has learned a relation between a series of pitches Y and the control data specifying a condition of a target sound, the model is established by machine learning using training data in which the control data is associated with the pitch Y in the reference signal R. Since the phases of fluctuations in the respective reference signals R are different from each other, the series of pitches Y with averaged fluctuations over the plurality of reference signals R is learned by the model in the comparative example. Therefore, for example, is the generated sound would have a tendency that the pitch Y statically changes during a sound-emitting period of one note. As can be understood from the above description, in the comparative example, it is difficult to generate a target sound including a plenty of fluctuations such as a music expression (e.g., vibrato) and a probabilistic fluctuation component.

In contrast to the comparative example described above, in the first embodiment, the first model M1 is established based on the first training data T1 including the series of fluctuations X and the first control data C1, and the second model M2 is established based on the second training data T2 including the series of pitches Y and the combination of the second control data C2 and the series of fluctuations X. According to the above configuration, a latent tendency of the series of fluctuations X and a latent tendency of the series of pitches Y are learned by different models, and the series of fluctuations X, which appropriately reflects the latent tendency of the fluctuations in each reference signal R, is generated by the first model M1. Therefore, as compared with the comparative example, it is possible to generate a series of pitches Y, which includes a plenty of fluctuations X. That is, it is possible to generate a target sound including a plenty of hearingly natural fluctuations X.

B: Second Embodiment

A second embodiment will be described. In the following embodiments, elements having the same functions as those of the first embodiment are denoted by the same reference numerals as those used in the description of the first embodiment, and detailed description thereof is omitted as appropriate.

Figure 7:
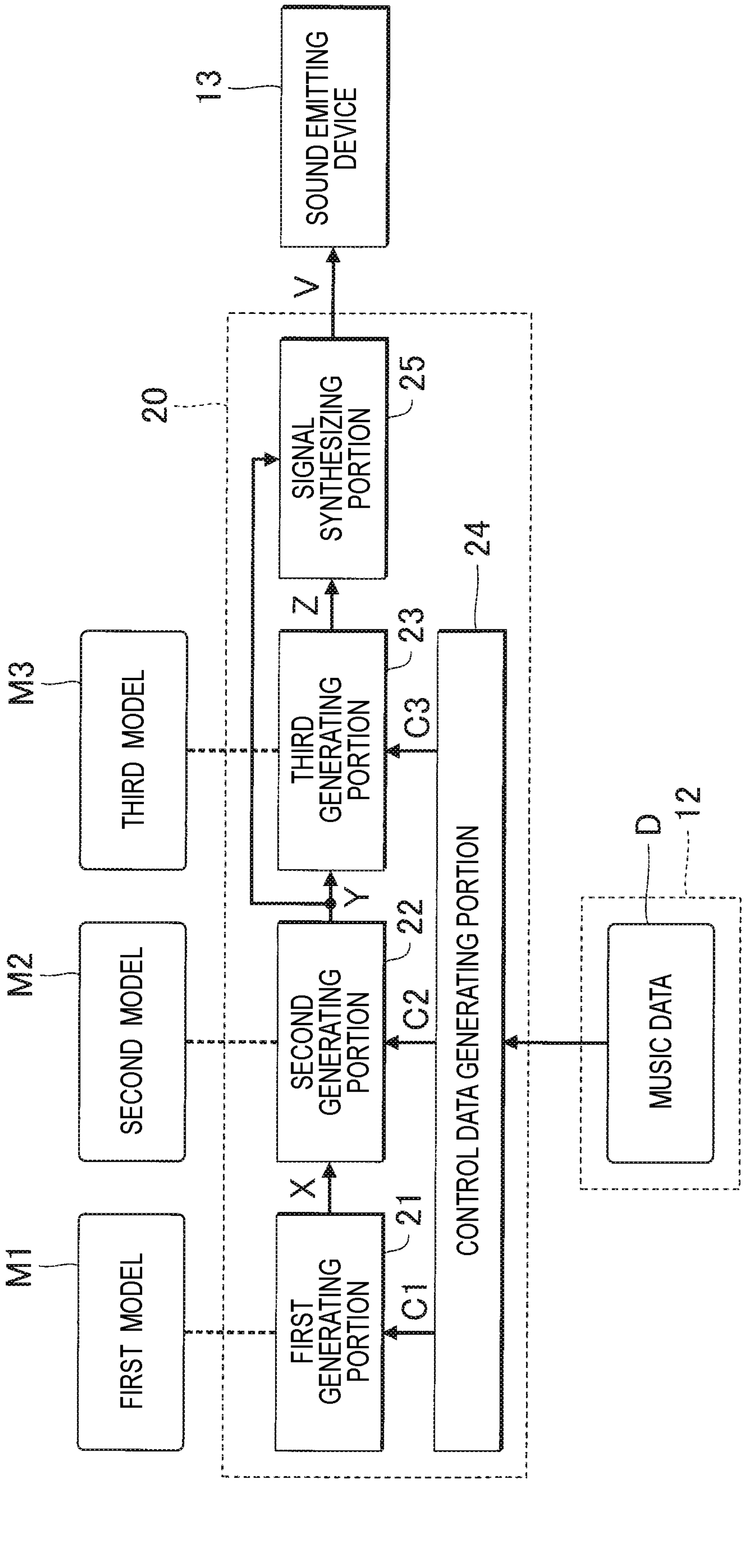
FIG. 7 is a block diagram illustrating a configuration of a synthesis processing portion according to a second embodiment.

FIG. 7 is a block diagram illustrating a configuration of a synthesis processing portion 20 according to the second embodiment. In the synthesis processing portion 20 of the second embodiment, the series of pitch Y, which is generated by the second generating portion 22, is supplied to the signal synthesizing portion 25. The series of spectral features Z in the second embodiment is an amplitude frequency envelope representing an outline of an amplitude spectrum. The amplitude frequency envelope is expressed by, for example, a mel spectrum or a mel-frequency cepstrum. The signal synthesizing portion 25 generates the sound signal V based on the series of the series of spectral features Z and the series of pitch Y. For each unit period, firstly, the signal synthesizing portion 25 generates a spectrum of a harmonic structure, which includes a fundamental and overtones corresponding to a pitch Y. Secondly, the signal synthesizing portion 25 adjusts the intensities of the peaks of the fundamental and overtones according to a spectral envelope represented by a spectral feature Z. Thirdly, the signal synthesizing portion 25 converts the adjusted spectrum into waveforms of the unit period and connects the waveforms over a plurality of unit periods to generate a sound signal V.

The signal synthesizing portion 25 may include a so-called neural vocoder that has learned a latent relation between the sound signal V and the combination of the series of the series of spectral features Z and the series of pitches Y by machine learning. The signal synthesizing portion 25 processes, using the neural vocoder, the supplied series of the pitches Y and the amplitude spectral envelope to generate the sound signal V.

The configurations and operations of the components other than the signal synthesizing portion 25 are basically the same as those of the first embodiment. Therefore, the same effects as those of the first embodiment are also achieved in the second embodiment.

C: Third Embodiment

Figure 8:
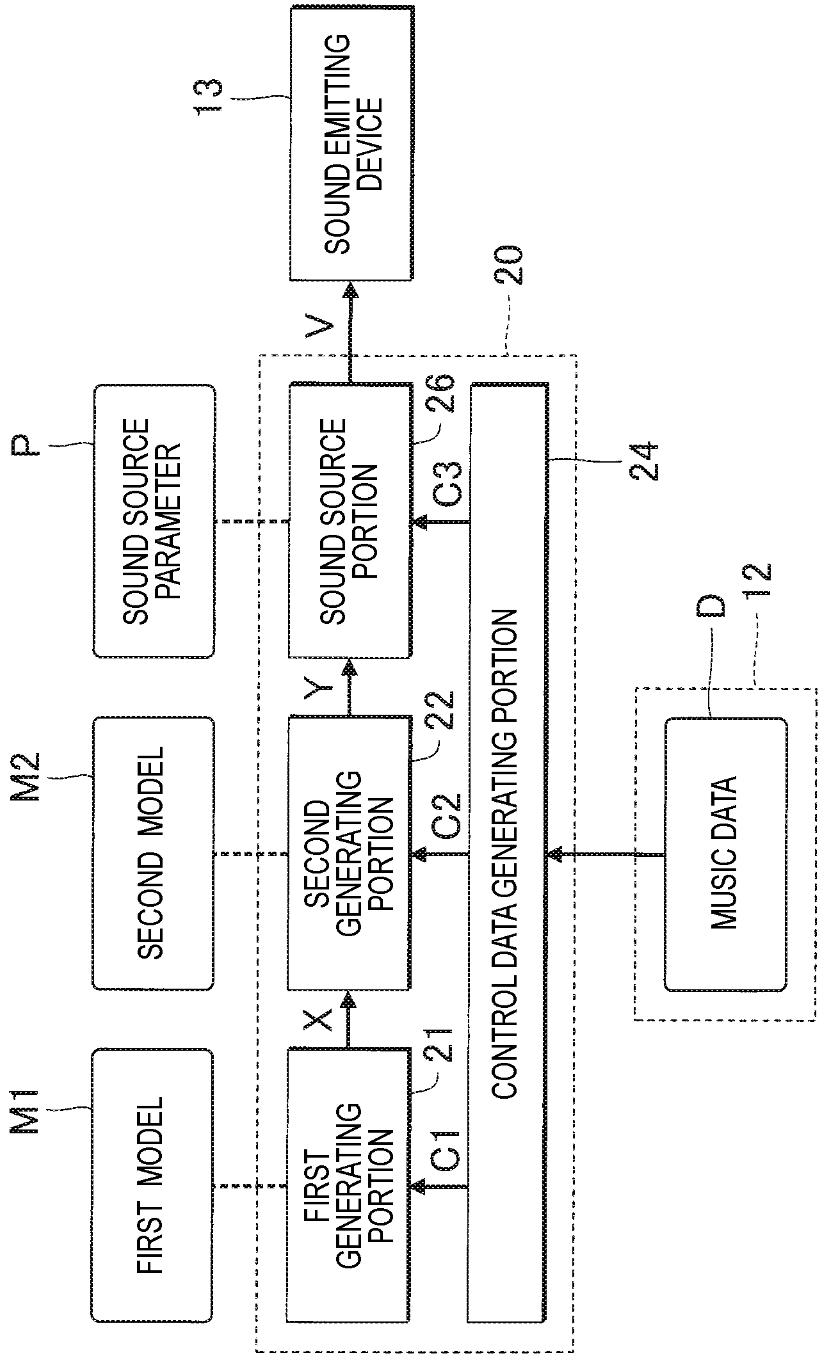
FIG. 8 is a block diagram illustrating a configuration of a synthesis processing portion according to a third embodiment.

FIG. 8 is a block diagram illustrating a configuration of a synthesis processing portion 20 according to the third embodiment. In the synthesis processing portion 20 of the third embodiment, the third generating portion 23 and the signal synthesizing portion 25 of the first embodiment are replaced with a sound source portion 26.

The sound source portion 26 is a sound source that generates a sound signal V according to the third control data C3 and the series of pitches Y. Various sound source parameters P used by the sound source portion 26 to the generation of the sound signal V are stored in the storage device 12. The sound source portion 26 generates the sound signal V according to the third control data C3 and the series of pitches Y by sound source processing using the sound source parameters P. For example, various sound sources such as a frequency modulation (FM) sound source are applied to the sound source portion 26. A sound source described in U.S. Pat. No. 7,626,113 or 4,218,624 is used as the sound source portion 26. The sound source portion 26 is implemented by the control device 11 executing a program, and is also implemented by an electronic circuit dedicated to the generation of the sound signal V.

The configurations and operations of the first generating portion 21 and the second generating portion 22 are basically the same as those in the first embodiment. The configurations and operations of the first model M1 and the second model M2 are also the same as those of the first embodiment. Therefore, the same effects as those of the first embodiment are realized in the third embodiment as well. As can be understood from the illustration of the third embodiment, the third generating portion 23 and the third model M3 in the first embodiment or the second embodiment may be omitted.

<Modification>

Specific modifications added to each of the aspects illustrated above will be illustrated below. Two or more aspects optionally selected from the following examples may be appropriately combined as long as they do not contradict each other.

(1) The first control data C1, the second control data C2, and the third control data C3 are illustrated as individual data in each of the above-described embodiments, but the first control data C1, the second control data C2, and the third control data C3 may be common data. Any two of the first control data C1, the second control data C2, and the third control data C3 may be common data.

Figure 9:
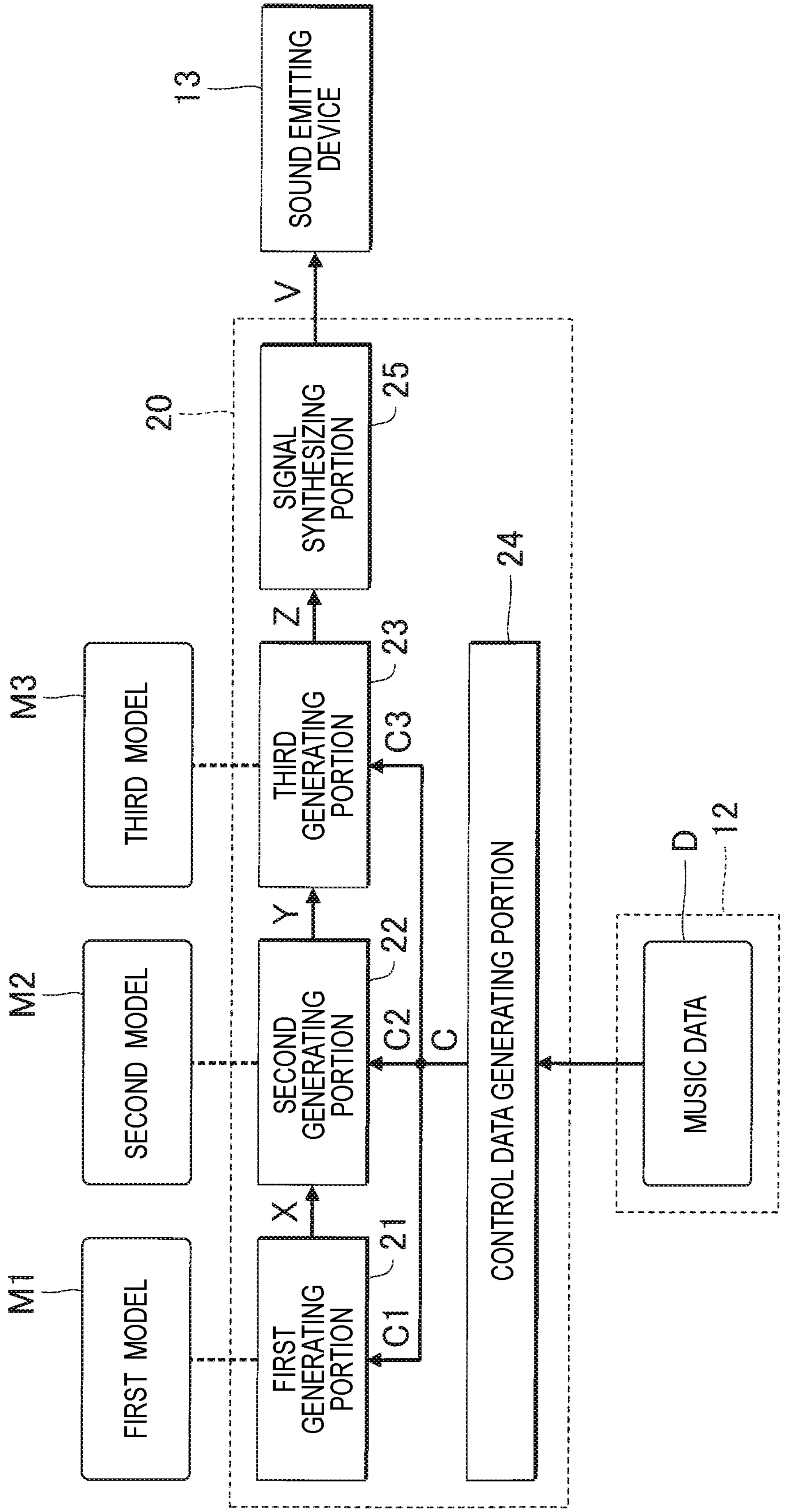
FIG. 9 is a block diagram illustrating a configuration of a synthesis processing portion according to a modification.

For example, as illustrated in FIG. 9, the control data C generated by the control data generating portion 24 may be supplied to the first generating portion 21 as the first control data C1, may be supplied to the second generating portion 22 as the second control data C2, and may be supplied to the third generating portion 23 as the third control data C3. Although FIG. 9 illustrates a modification based on the first embodiment, the configuration in which the first control data C1, the second control data C2, and the third control data C3 are shared is similarly applied to the second embodiment or the third embodiment.

Figure 10:
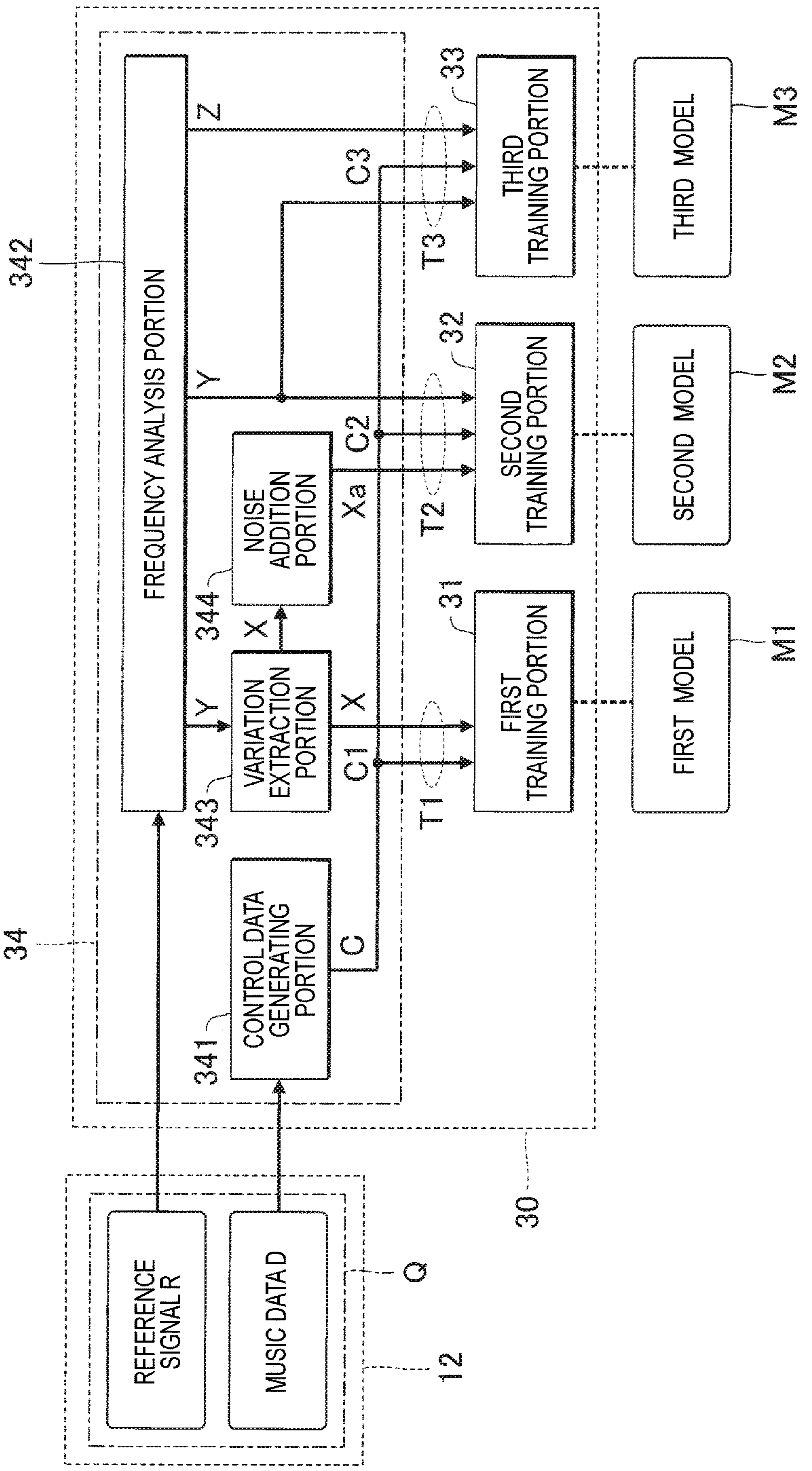
FIG. 10 is a block diagram illustrating a configuration of a learning processing portion according to a modification.

As illustrated in FIG. 10, the control data C generated by the control data generating portion 341 may be supplied to the first training portion 31 as the first control data C1, may be supplied to the second training portion 32 as the second control data C2, and may be supplied to the third training portion 33 as the third control data C3.

(2) The second model M2 generates the series of pitches Y in each of the above-described embodiments, but the features generated by the second model M2 is not limited to the pitches Y. For example, the second model M2 may generate a series of amplitudes of a target sound, and the first model M1 may generate a series of fluctuations X in the series of amplitudes. The second training data T2 and the third training data T3 include the series of amplitudes of the reference signal R instead of the series of pitches Y in each of the above-described embodiments, and the first training data T1 includes the series of fluctuations X relating to the series of amplitudes.

In addition, for example, the second model M2 may generate a series of timbres (for example, a mel-frequency cepstrum for each time frame) representing the tone color of the target sound, and the first model M1 may generate a series of fluctuations X in the series of timbres. The second training data T2 and the third training data T3 include the series of timbres of the picked-up sound instead of the series of pitches Yin each of the above-described embodiments, and the first training data T1 includes the series of fluctuations X relating to the series of timbres of the picked-up sound. As can be understood from the above description, the features in this specification cover any type of physical quantities representing any feature of a sound, and the pitches Y, the amplitudes, and the timbres are examples of the features.

(3) The series of pitches Y is generated based on the series of fluctuations X for the pitches Yin each of the above-described embodiments, but the features represented by the series of fluctuations X generated by the first generating portion 21 and the features generated by the second generating portion 22 may be different types of feature quantities each other. For example, it is assumed that a series of fluctuations of the pitches Y in a target sound tends to correlate with a series of fluctuations of the series of amplitudes of the target sound. By consideration of the above tendency, the series of fluctuations X generated by the first generating portion 21 using the first model M1 may be a series of fluctuations of the amplitudes. The second generating portion 22 generates a series of the pitches Y by inputting the second control data C2 and the series of fluctuations X of the amplitudes to the first model M1. The first training data T1 includes the first control data C1 and the series of fluctuations X of the amplitudes. The second training data T2 is a piece of known data in which a combination of the second control data C2 and the series of fluctuations Xa of the amplitudes is associated with the pitch Y. As can be understood from the above example, the first generating portion 21 is comprehensively expressed as an element that outputs the first control data C1 of the target sound to the first model M1 that is trained to receive the first control data C1 and estimate the series of fluctuations X, and the features represented by the series of fluctuations X is an optional type of features correlated with the features generated by the second generating portion 22.

(4) The sound synthesizer 100 including both the synthesis processing portion 20 and the learning processing portion 30 has been illustrated in each of the above-described embodiments, but the learning processing portion 30 may be omitted from the sound synthesizer 100. In addition, a model constructing device including the learning processing portion 30 only may be easily obtained from the disclosure. The model constructing device is also referred to as a machine learning device that constructs a model by machine learning. The presence or absence of the synthesis processing portion 20 in the model constructing device is not essential, and the presence or absence of the learning processing portion 30 in the sound synthesizer 100 is not essential.

(5) The sound synthesizer 100 may be implemented by a server device that communicates with a terminal device such as a mobile phone or a smartphone. For example, the sound synthesizer 100 generates a sound signal V according to the music data D received from the terminal device, and transmits the sound signal V to the terminal device. In a configuration in which the control data C (C1, C2, C3) is transmitted from the terminal device, the control data generating portion 24 is omitted from the sound synthesizer 100.

(6) As described above, the functions of the sound synthesizer 100 illustrated above are implemented by cooperation between one or more processors constituting the control device 11 and programs (for example, the sound synthesis program G1 and the machine learning program G2) stored in the storage device 12. The program according to the present disclosure may be provided in a form of being stored in a computer-readable recording medium and may be installed in the computer. The recording medium is, for example, a non-transitory recording medium, and is preferably an optical recording medium (optical disc) such as a CD-ROM. Any known type of recording medium such as a semiconductor recording medium or a magnetic recording medium is also included. The non-transitory recording medium includes an optional recording medium except for a transient propagating signal, and a volatile recording medium is not excluded. In a configuration in which a distribution device distributes a program via a communication network, a storage device that stores the program in the distribution device corresponds to the above-described non-transitory recording medium.

(7) The execution subject of the artificial intelligence software for implementing the model M (M1, M2, M3) is not limited to the CPU. For example, a processing circuit dedicated to a neural network such as a tensor processing portion and a neural engine, or a digital signal processor (DSP) dedicated to artificial intelligence may execute artificial intelligence software. In addition, a plurality of types of processing circuits selected from the above examples may execute the artificial intelligence software in cooperation with each other.

APPENDIX

For example, the following configurations can be understood from the embodiments described above.

An information processing method according to an aspect (first aspect) of the present disclosure includes: generating a series of fluctuations of a target sound by processing first control data of the target sound to be synthesized, using a first model trained to have an ability to estimate a series of fluctuations of a target sound based on first control data of the target sound; and generating a series of features of the target sound by processing second control data of the target sound and the generated series of fluctuations of the target sound, using a second model trained to have an ability to estimate a series of features of the target sound based on second control data of the target sound and a series of fluctuations of the target sound.

In the above aspect, the series of fluctuations according to the first control data is generated using the first model, and the series of features according to the second control data and the series of fluctuations is generated using the second model. Therefore, it is possible to generate a series of features, which includes a plenty of fluctuations, as compared with a case of using a single model that leans a relation between the control data and the series of features.

The "series of fluctuations" is a dynamic component that fluctuates with time in the target synthesis sound to be synthesized. A component that fluctuates with time in a series of features corresponds to the "series of fluctuations", and a component that fluctuates with time in a series of features different from the feature amount is also included in the concept of the "series of fluctuations". For example, assuming a static component that varies slowly with time in series of the features, a dynamic component other than the static component corresponds to the series of fluctuations. The first control data may be same as the second control data, and may be different from the second control data.

For example, the series of features indicates at least one of a series of pitches of the target synthesis sound, an amplitude of the target synthesis sound, and a tone of the target synthesis sound.

In a specific example (second aspect) of the first aspect, a series of fluctuations relating to the series of features of the target synthesis sound is generated in the generating of the series of fluctuations.

In the above aspect, the series of features represented by the series of fluctuations generated by the first model and the series of features generated by the second model are the same type, and therefore, it is possible to generate a series of features that varies naturally in a hearing, as compared with a case where a series of fluctuations of a series of features different from the series of features generated by the second model is generated by the first model.

In a specific example (third aspect) of the second aspect, the series of fluctuations is a differential value of the series of features. In another specific example (fourth aspect) of the second aspect, the series of fluctuations is a component in a frequency band higher than a predetermined frequency in the series of features of the target sound.

In a specific example (fifth aspect) of any one of the first to three aspects, a series of spectral features of the target sound is generated by processing third control data of the target sound and the generated series of features of the target sound, using a third model trained to have an ability to estimate a series of spectral features of the target sound based on third control data and a series of features of the target sound. The first control data may be same as the second control data, and may be different from the second control data.

For example, the generated first series of spectral features of the target sound is a frequency spectrum of the target sound or an amplitude frequency envelope of the target sound.

For example, in the information processing method, a sound signal is generated based on the generated series of spectral features of the target sound.

An estimation model construction method according to one aspect (sixth aspect) of the present disclosure includes: generating a series of features and a series of fluctuations based on a reference signal indicating a picked-up sound for training; establishing, by machine learning using first control data corresponding to the picked-up sound and a series of fluctuations of the picked-up sound, a first model trained to have an ability to estimate a series of fluctuations of a target sound to be synthesized based on first control data of the target sound; and establishing, by machine learning using second control data corresponding to the picked-up sound, the series of fluctuations, and the series of features, a second model trained to have an ability to estimate a series of features of the target sound based on second control data of the target sound and a series of fluctuations of the target sound.

In the above aspect, the first model, which processes the first control data and estimates a series of fluctuations, and the second model, which processes the second control data and the series of fluctuations and estimates the series of features, are established. Therefore, it is possible to generate a series of features including a plenty of fluctuations as compared with a case of establishing a single model that leans the relation between the control data and the series of features.

An information processing device according to a seventh aspect includes: a memory storing instructions, and a processor configured to implement the stored instructions to execute a plurality of tasks. The tasks includes: a first generating task that generates a series of fluctuations of a target sound based on first control data of the target sound to be synthesized, using a first model trained to have an ability to estimate a series of fluctuations of the target sound based on first control data of the target sound; and a second generating task that generates a series of features of the target sound based on second control data of the target sound and the generated series of fluctuations of the target sound, using a second model trained to estimate a series of features of the target sound based on second control data of the target sound and a series of fluctuations of the target sound.

An estimation model constructing device according to an eighth aspect includes: a memory storing instructions, and a processor configured to implement the stored instructions to execute a plurality of tasks. The tasks includes: a generating task that generates a series of features and a series of fluctuations based on a reference signal indicating a picked-up sound for training; a first training task that establishes, by machine learning using first control data corresponding to the picked-up sound and a series of fluctuations of the picked-up sound, a first model trained to have an ability to estimate a series of fluctuations of a target sound to be synthesized based on first control data of the target sound; and a second training task that establishes, by machine learning using second control data corresponding to the picked-up sound, the series of fluctuations, and the series of features, a second model trained to have an ability to estimate a series of features of the target sound based on second control data of the target sound and a series of fluctuations of the target sound.

A program according to a ninth aspect causes a computer to function as: a first generating portion that generates a series of fluctuations of a target sound based on first control data of the target sound to be synthesized, using a first model trained to have an ability to estimate a series of fluctuations of the target sound based on first control data of the target sound; and a second generating portion that generates a series of features of the target sound based on second control data of the target sound and the generated series of fluctuations of the target sound, using a second model trained to estimate a series of features of the target sound based on second control data of the target sound and a series of fluctuations of the target sound.

A program according to a tenth aspect causes a computer to function as: a generating portion that generates a series of features and a series of fluctuations based on a reference signal indicating a picked-up sound for training; a first training portion that establishes, by machine learning using first control data corresponding to the picked-up sound and a series of fluctuations of the picked-up sound, a first model trained to have an ability to estimate a series of fluctuations of a target sound to be synthesized based on first control data of the target sound; and a second training portion that establishes, by machine learning using second control data corresponding to the picked-up sound, the series of fluctuations, and the series of features, a second model trained to have an ability to estimate a series of features of the target sound based on second control data of the target sound and a series of fluctuations of the target sound.

The information processing method, the estimation model construction method, the information processing device, and the estimation model constructing device of the present disclosure can generate a synthesis sound with high sound quality in which a series of a features appropriately includes a series of fluctuations.

REFERENCE SIGNS LIST

100 Sound synthesizer
11 Control device
12 Storage device
13 Sound emitting device
20 Synthesis processing portion
21 First generating portion
22 Second generating portion
23 Third generating portion
24 Control data generating portion
25 Signal synthesizing portion
26 Sound source portion
30 Learning processing portion
31 First training portion
32 Second training portion
33 Third training portion
34 Training data preparation portion
341 Control data generating portion
342 Frequency analysis portion
343 Variation extraction portion
344 Noise addition portion
M1 First model
M2 Second model
M3 Third model

What is claimed is:

1. A sound synthesizing method of synthesizing an audio signal from music data, the method comprising:

generating a first model, which is a first neural network, trained using first training data to estimate a series of fluctuations for each unit period;

generating a second model, which is a second neural network, trained using second training data to estimate a series of features for each unit period;

obtaining from the music data:

a first series of control data of a target sound to be synthesized; and a second series of control data of the target sound to be synthesized;

generating a series of fluctuations, which is a dynamic component that fluctuates with time, of the target sound based on the first series of control data of the target sound to be synthesized obtained from the music data with the first model; and generating a series of features, which indicate a series of at least one of pitches, amplitudes, or tones, of the target sound based on the second series of control data of the target sound obtained from the music data and the generated series of fluctuations of the target sound with the second model; and generating the audio signal representing a waveform of the target sound based on the generated series of features.

2. The sound synthesizing method according to claim 1, wherein the generated series of fluctuations of the target sound affect the series of features of the target sound to be generated.

3. The sound synthesizing method according to claim 2, wherein the generated series of fluctuations of the target sound affect differential values of the series of features of the target sound to be generated.

4. The sound synthesizing method according to claim 2, wherein the generated series of fluctuations of the target sound affect components in a frequency band higher than a predetermined frequency in the series of features of the target sound.

5. The sound synthesizing method according to claim 1, wherein:

the method further comprises generating a third model, which is a third neural network, trained using third training data to estimate a series of spectral features for each unit period;

the obtaining further obtains a third series of control data of the target sound to be synthesized, and the method further comprises generating a series of spectral features of the target sound based on third series of control data of the target sound obtained from the music data and the generated series of features of the target sound with the third model.

6. The sound synthesizing method according to claim 5, wherein the generated series of spectral features of the target sound is a frequency spectrum of the target sound or an amplitude frequency envelope of the target sound.

7. The sound synthesizing method according to claim 5, wherein the generating of the audio signal generates the audio signal further based on the generated series of spectral features of the target sound.

8. The sound synthesizing method according to claim 1, wherein:

the first training data is generated from training music data and a reference signal representing waveforms of sound of the training music data, and includes the first series of control data; and the second training data is generated from the training music data and the reference signal, and includes the second series of control data.

9. A sound synthesizing device for synthesizing an audio signal from music data, the sound synthesizing device comprising:

a memory storing instructions; and a processor configured to implement the stored instructions to:

generate a first model, which is a first neural network, trained using first training data to estimate a series of fluctuations for each unit period;

generate a second model, which is a second neural network, trained using second training data to estimate a series of features for each unit period;

obtain from the music data:

a first series of control data of a target sound to be synthesized; and a second series of control data of the target sound to be synthesized;

generate a series of fluctuations, which is a dynamic component that fluctuates with time, of the target sound based on the first series of control data of the target sound to be synthesized obtained from the music data with the first model; and generate a series of features, which indicate a series of at least one of pitches, amplitudes, or tones, of the target sound based on second series of control data of the target sound obtained from the music data and the generated series of fluctuations of the target sound with the second model; and generate the audio signal representing a waveform of the target sound based on the generated series of features.

10. The sound synthesizing device according to claim 9, wherein:

the first training data is generated from training music data and a reference signal representing waveforms of sound of the training music data, and includes the first series of control data; and the second training data is generated from the training music data and the reference signal, and includes the second series of control data.

11. The sound synthesizing method according to claim 1, wherein the first control data specifies a condition of the series of fluctuations.

12. The sound synthesizing method according to claim 1, wherein the first model is trained with the first training data to learn a relation between the series of fluctuations and the first control data.

13. The sound synthesizing method according to claim 1, wherein the generated series of features indicate at least the series of pitches.

14. The sound synthesizing method according to claim 13, wherein the series of fluctuations are high-frequency components that are higher than predetermined pitches in the series of features.

15. The sound synthesizing method according to claim 1, where the obtaining obtains the first series of control data and the second series of control data using a third model, which is a third neural network.

16. The sound synthesizing method according to claim 1, wherein the first control data is the same as the second control data.

* * * * *